US009227686B2

(12) United States Patent
Herzel et al.

(10) Patent No.: US 9,227,686 B2
(45) Date of Patent: Jan. 5, 2016

(54) FREE-WHEELING, FREE-STEERING, FOLDABLE MULTI-STAGE TRICYCLE WITH A SINGLE-MOTION RELEASE MECHANISM

(75) Inventors: Gadi Herzel, Natanya (IL); Yuval Stenitzky, Natanya (IL)

(73) Assignee: GALILEO TRIKES LTD., Moshav Tsur-Moshe (IL)

( * ) Notice: Subject to any disclaimer, the term of this patent is extended or adjusted under 35 U.S.C. 154(b) by 0 days.

(21) Appl. No.: 13/824,410

(22) PCT Filed: Sep. 3, 2012

(86) PCT No.: PCT/IB2012/054531
§ 371 (c)(1),
(2), (4) Date: Mar. 18, 2013

(87) PCT Pub. No.: WO2014/033503
PCT Pub. Date: Mar. 6, 2014

(65) Prior Publication Data
US 2015/0158544 A1 Jun. 11, 2015

(51) Int. Cl.
*B62K 15/00* (2006.01)
*B62K 13/04* (2006.01)
*B62K 9/02* (2006.01)
*B62K 21/02* (2006.01)
*B62K 21/12* (2006.01)
*B62K 23/06* (2006.01)

(52) U.S. Cl.
CPC .................. *B62K 15/008* (2013.01); *B62K 9/02* (2013.01); *B62K 13/04* (2013.01); *B62K 21/02* (2013.01); *B62K 21/12* (2013.01); *B62K 23/06* (2013.01); *B62K 2015/001* (2013.01)

(58) Field of Classification Search
CPC ............... B62K 9/02; B62K 5/02; B62K 5/06
See application file for complete search history.

(56) References Cited

U.S. PATENT DOCUMENTS

| 6,386,566 | B1 * | 5/2002 | Freeberg et al. | 280/237 |
| 6,644,676 | B2 | 11/2003 | Wu | |
| 8,313,117 | B2 * | 11/2012 | Khare et al. | 280/270 |
| 2011/0278815 | A1 | 11/2011 | Khare et al. | |
| 2013/0056949 | A1 * | 3/2013 | Bricker et al. | 280/259 |

FOREIGN PATENT DOCUMENTS

| FR | 2843937 | 3/2004 |
| GB | 1432583 | 4/1976 |

* cited by examiner

*Primary Examiner* — Kevin Hurley
(74) *Attorney, Agent, or Firm* — Mark M Friedman

(57) ABSTRACT

A foldable tricycle, including a front wheel assembly; a mainframe, latched to the front wheel assembly via a front mount; a pair of rear-wheel assemblies; a pair of folding ring assemblies coupling the rear-wheel assemblies to the mainframe; and a mechanism for simultaneously unlocking the pair of ring assemblies and unlatching the mainframe from the front wheel assembly so that a single pulling motion on the mechanism unlocks and unlatches the foldable tricycle from an assembled state thereof so as to be converted to a folded state thereof.

17 Claims, 9 Drawing Sheets

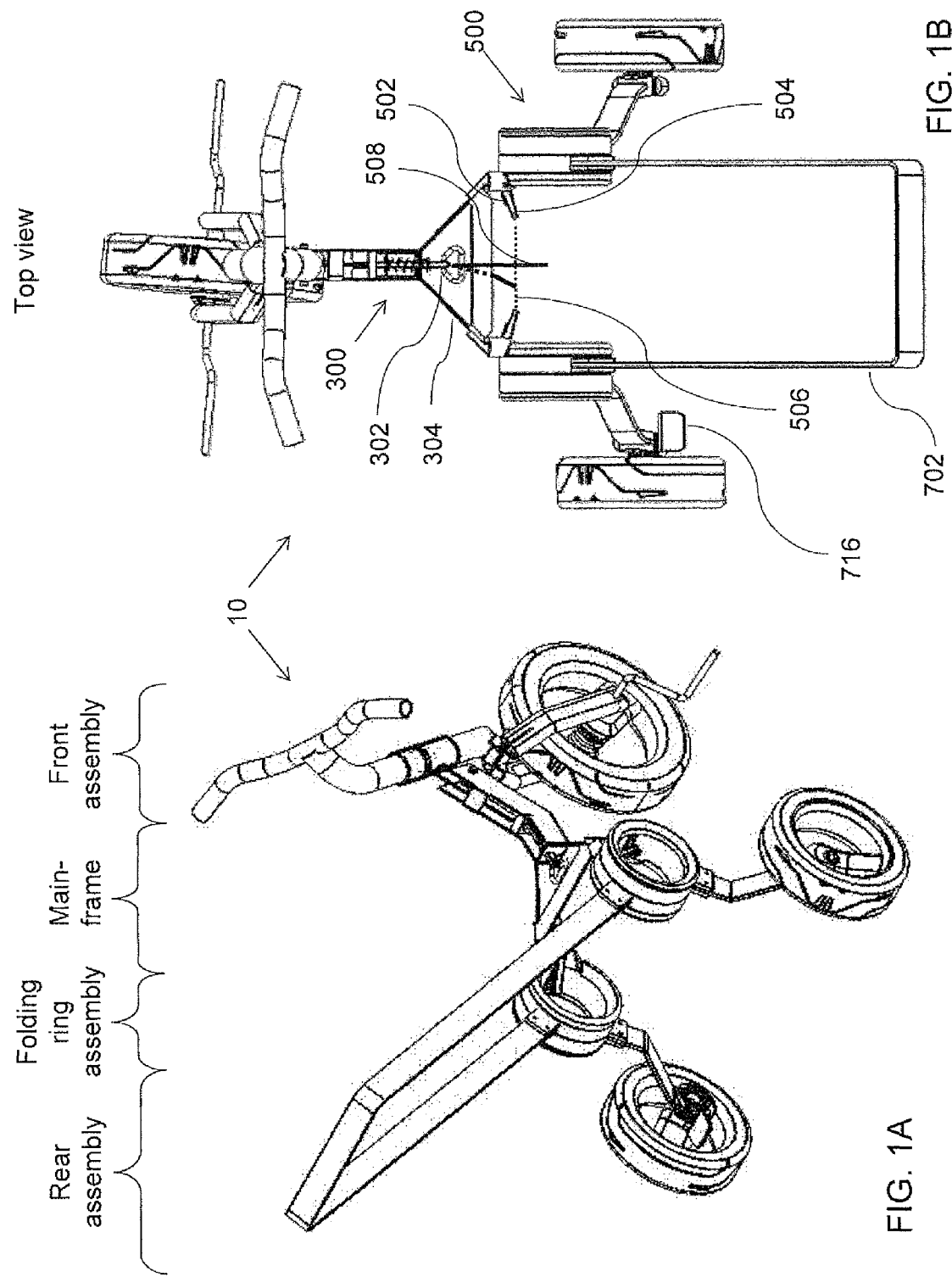

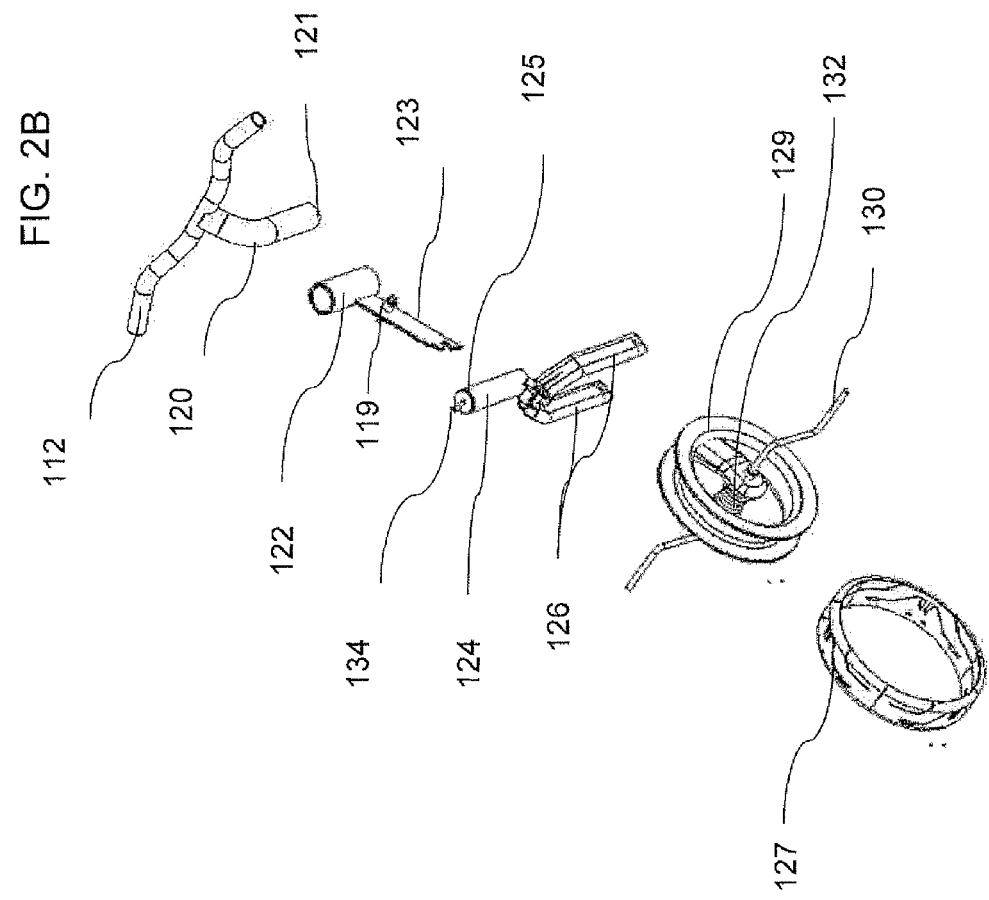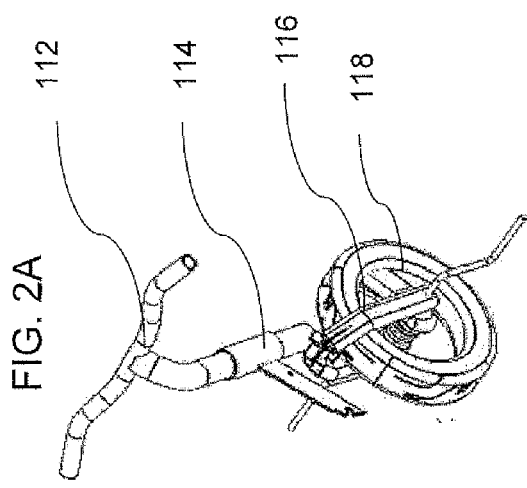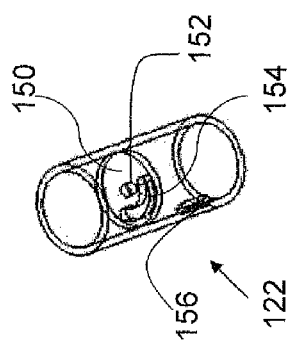

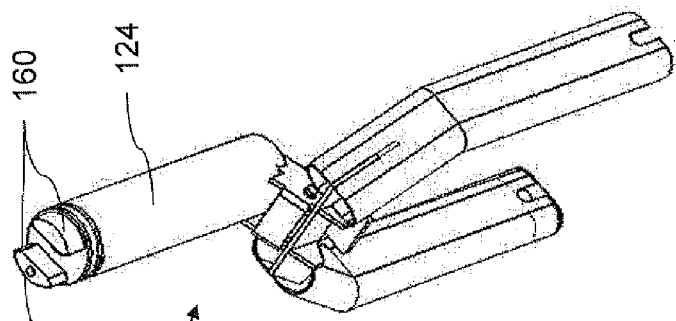
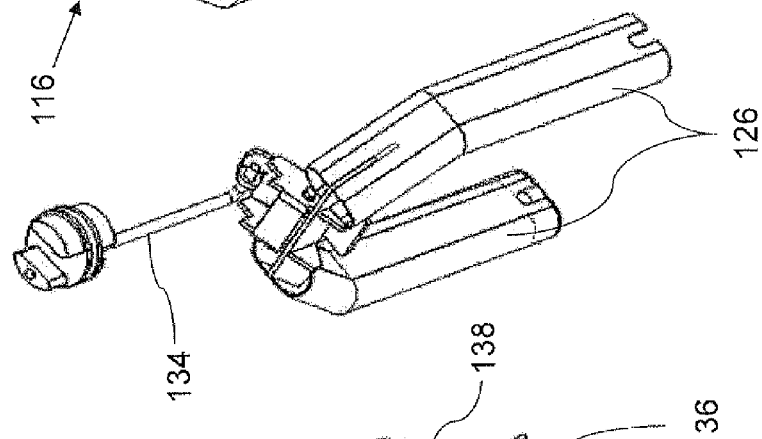
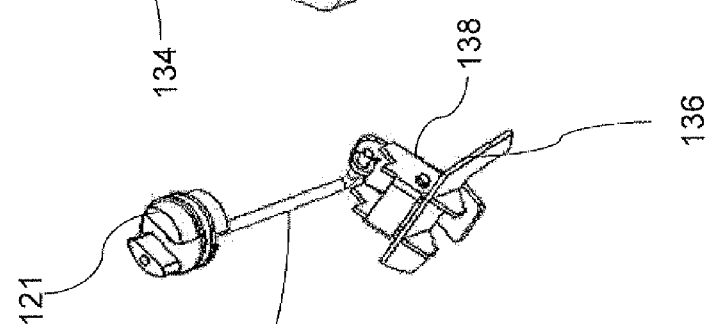
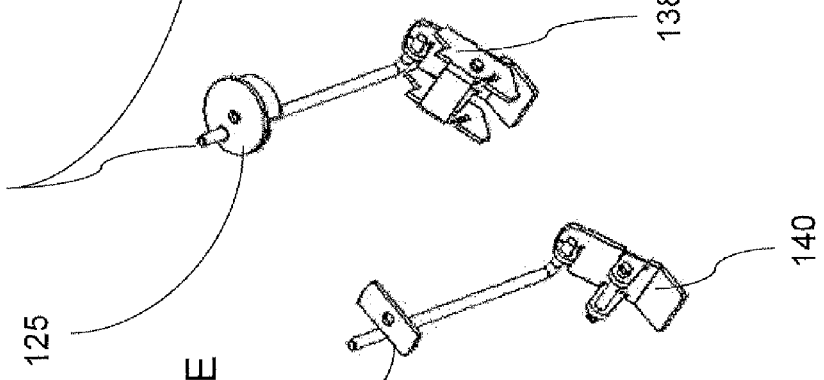
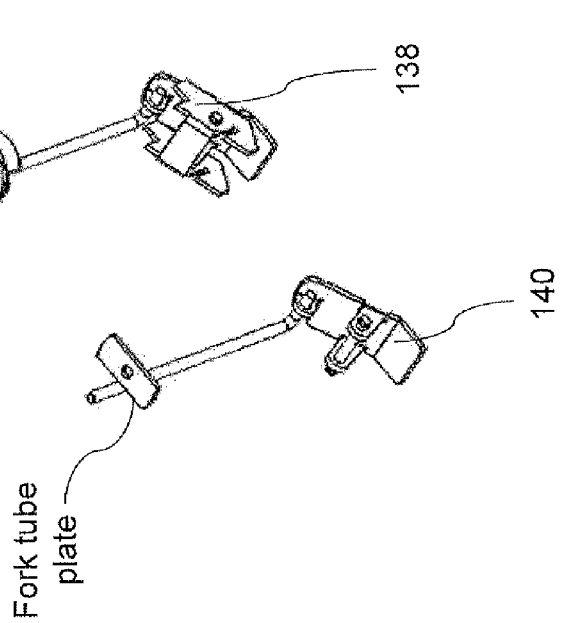

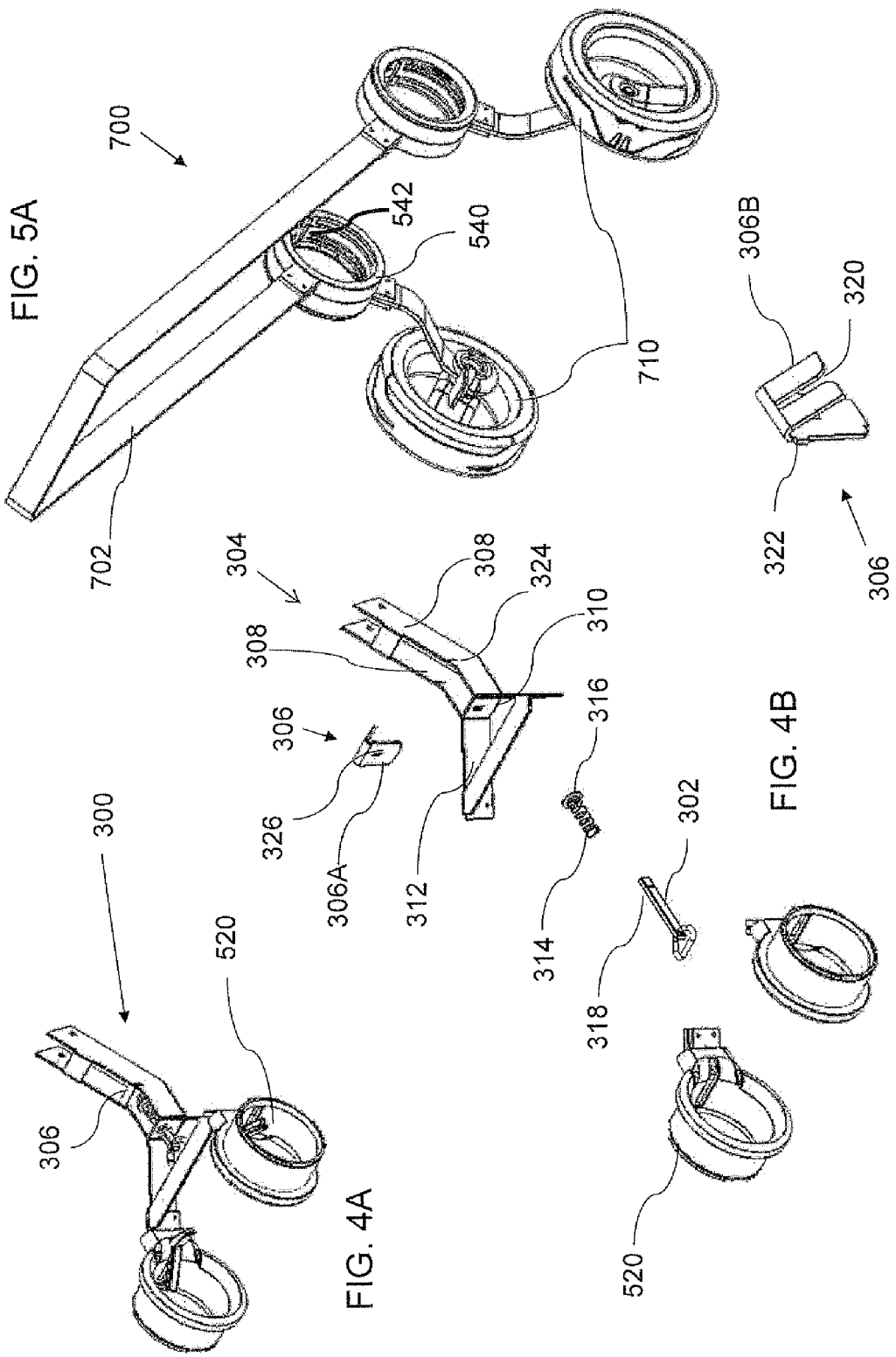

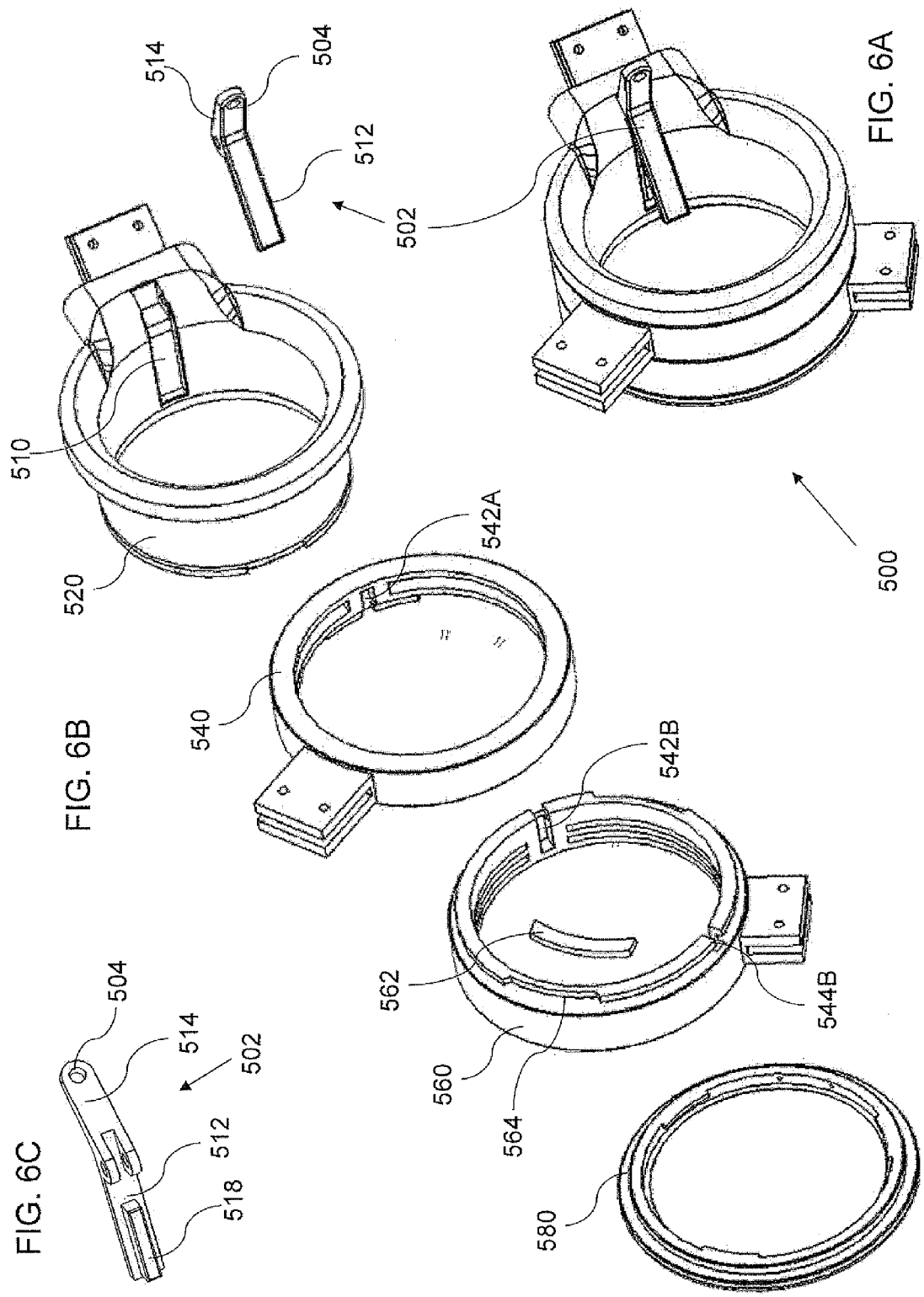

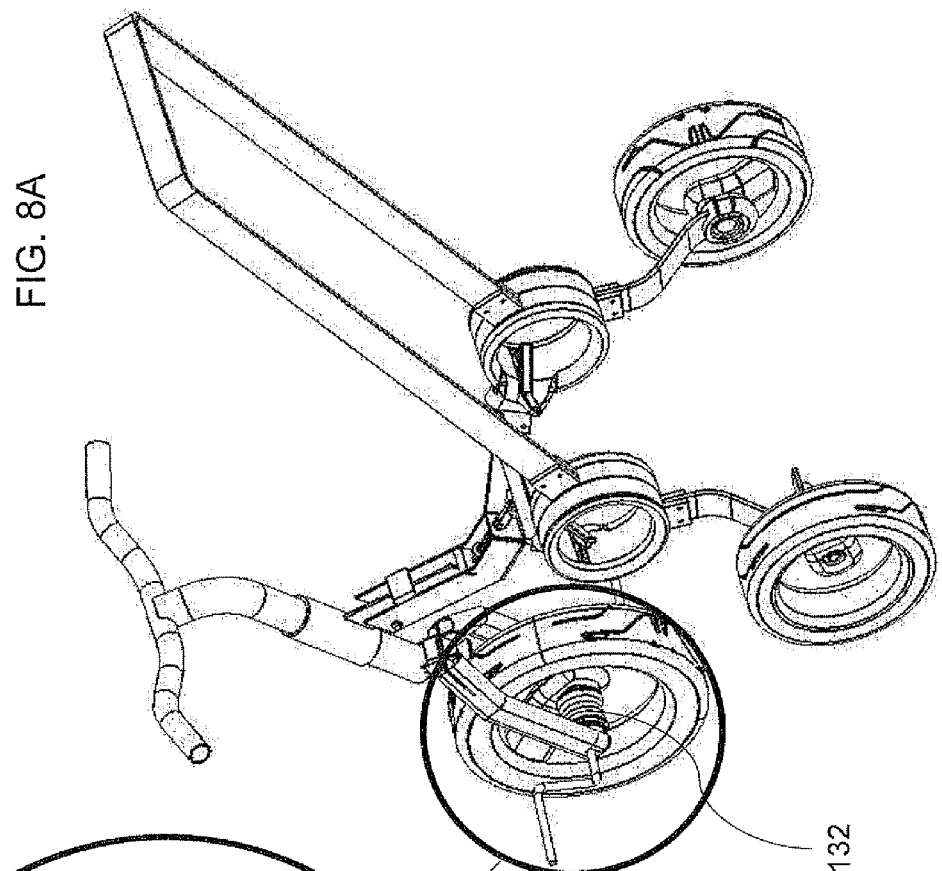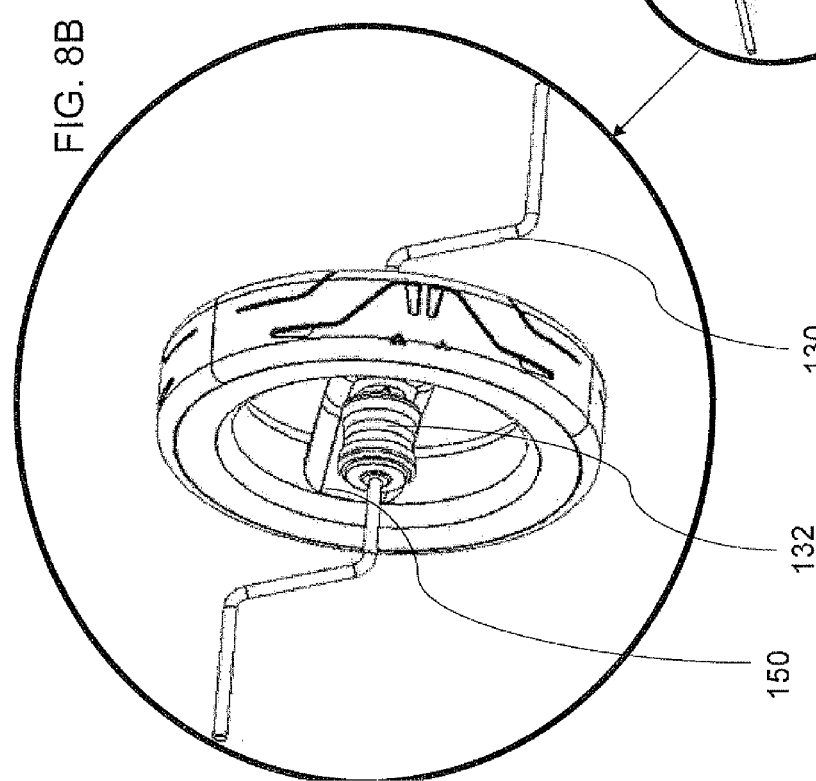

FREE-WHEELING, FREE-STEERING, FOLDABLE MULTI-STAGE TRICYCLE WITH A SINGLE-MOTION RELEASE MECHANISM

FIELD AND BACKGROUND OF THE INVENTION

The present invention relates to a tricycle and, more particularly, to an improved multi-stage tricycle with a single-motion release mechanism.

Multi-stage tricycles are known in the art such as multi-stage tricycles including steering handles which are intended to be used by an adult to propel and steer the tricycle when the child is too young to successfully do so himself and to be removed later as the child ages. All of the known steering handles suffer similar drawbacks. Namely, the steering handles are coupled to the steering column of the tricycle via a complex set of wires and mechanisms. Furthermore, the single-column configuration of the steering handle makes the steering process difficult.

Collapsible polycycles are also known in the art. The known processes of collapsing polycycles, include numerous separate steps which are necessary to perform in order to convert the assembled polycycle into the folded state.

It would be highly advantageous to have a multi-stage tricycle with a simplified steering handle providing improved control and also having an improved free-wheeling feature as well as a free steering feature. It would furthermore be advantageous to have single-motion release mechanism for folding the tricycle.

SUMMARY OF THE INVENTION

According to the present invention there is provided a foldable tricycle, including a front wheel assembly; a mainframe, latched to the front wheel assembly via a front mount; a pair of rear-wheel assemblies; a pair of folding ring assemblies coupling the rear-wheel assemblies to the mainframe; and a mechanism for simultaneously unlocking the pair of ring assemblies and unlatching the mainframe from the front wheel assembly so that a single pulling motion on the mechanism unlocks and unlatches the foldable tricycle from an assembled state thereof so as to be converted to a folded state thereof.

According to further features in preferred embodiments of the invention described below the mainframe includes a Y-shaped chassis; and a pinlock, journalled within a pinlock spring, where the pinlock spring terminates in a pinlock clip disk operationally coupled to the pinlock, wherein the pinlock is biased by the pinlock spring and adapted to reversibly latch the mainframe to the front mount.

According to still further features in the described preferred embodiments each of the pair of ring assemblies includes: (i) a hubless tube, operationally coupled to the mainframe, the hubless tube including: (A) a spring-loaded rocker swing lock, and (B) a locking aperture, formed in the hubless tube, the locking aperture adapted to receive the rocker swing lock; (ii) a hubless handle ring, operationally coupled to the hubless tube and further adapted to be coupled to an arm of a guide handle; and (iii) a hubless wheel ring, operationally coupled to the hubless handle ring and to a rear-wheel assembly, wherein the hubless wheel ring and the hubless handle ring are coaxially positioned, and wherein the hubless tube defines an axle about which the rings are adapted to swivel.

According to still further features the mechanism includes: (i) a line, operationally coupling the spring-loaded rocker swing locks; and (ii) a tether, operationally coupled to the line and looped through a ring of the pinlock, wherein the tether is adapted to be pulled, thereby simultaneously retracting the pinlock and extracting the spring-loaded rocker swing locks from the apertures, thereby unlatching the front mount from the mainframe and unlocking the ring assemblies to allow the tricycle to be converted from the assembled state to the folded state.

According to still further features the ring assemblies have a first, assembled, configuration when the tricycle is in the assembled state and a second, folded, configuration when the tricycle is in the folded state, and wherein the hubless wheel rings and the hubless handle rings are adapted to swivel about the hubless tubes when the spring-loaded rocker swing locks are located externally from the apertures, so as to reversibly convert the tricycle from the assembled state to the folded state.

According to still further features the first configuration, in each of the ring assemblies the rocker swing lock rests in the aperture of the hubless tube and protrudes partially through the aperture to rest in a first locking groove portion formed in the hubless handle ring and in a first locking groove portion formed in the hubless wheel ring, when the locking grove portions are aligned, thereby preventing rotation of the hubless rings about the hubless tube when in the first configuration, and wherein in the second configuration the rocker swing lock rests in the aperture of the hubless tube and protrudes partially through the aperture to rest in a second locking groove portion formed in the hubless handle ring and in a second locking groove portion formed in the hubless wheel ring, when the second locking groove portions are aligned, thereby preventing rotation of the hubless rings about the hubless tube when in the second configuration.

According to still further features each of the pair of ring assemblies further includes: (iv) a loose tongue, configured to be received within an aperture formed in swivel guide grooves of the hubless handle ring and the hubless wheel ring, so as to limit a swivel range of the hubless handle ring and the hubless wheel ring.

According to still further features the limited swivel range of the hubless handle ring is between about 95° and 150° of rotation and wherein the limited swivel range of the hubless wheel ring is between about 160° and 200° of rotation.

According to still further features the tricycle further includes a removable guide handle, adapted to connect to the folding ring assembly.

According to still further features the guide handle is a telescoping handle.

According to still further features the front wheel assembly includes: (i) a handlebar; (ii) a handlebar tube, coupled to the handlebar; (iii) a fork, including a locking mechanism configured to reversibly couple the fork to the handlebar tube thereby electively providing handlebar-directed steering when the fork is coupled to the handlebar tube and handlebar-free steering when the fork is uncoupled from the handlebar tube.

According to still further features the locking mechanism includes: (A) a handle tube cap, capping the handlebar tube, (B) a fork tube cap, capping the fork, (C) a fork lock pin, journalled within the fork tube cap and adapted to be reversibly journalled within the handle tube cap, and (D) a fork lock lever, operationally coupled to the fork lock pin such that manipulation of the fork lock lever reversibly journals the fork lock pin in the handle tube cap.

According to still farther features the front wheel assembly further includes: (iv) a front wheel, coupled to the fork, (v) a pedal lock coupled to the front wheel; and (vi) a pedal bar journalled within the pedal lock, wherein the pedal lock is adapted to reversibly lock the pedal bar to the front wheel, such that when the pedal bar is locked to the front wheel then the tricycle is in a pedal-wheeling state and when the pedal bar is unlocked from the front wheel then the tricycle is in a free-wheeling state.

According to still further features the rear-wheel assemblies include: (i) rear-wheel arms, operationally coupled to the folding ring assemblies; and (ii) rear wheels, operationally coupled to the rear-wheel arms.

According to still further features at least one of the rear-wheel assemblies further includes a brake lever operationally coupled to a braking mechanism for braking at least one of the rear wheels.

According to another embodiment a multi-stage tricycle includes: (a) a handlebar; (b) a handlebar tube, operationally coupled to the handlebar; (c) a front mount, associated with the handlebar tube; (d) a fork, associated with the front mount, the fork including a locking mechanism configured to reversibly couple the fork to the handlebar tube thereby electively providing handlebar-directed steering when the fork is coupled to the handlebar tube and handlebar-free steering when the fork is uncoupled from the handlebar tube.

According to further features the locking mechanism includes: (i) a handle tube cap, capping the handlebar tube, (ii) a fork tube cap, capping the fork, (iii) a fork lock pin, journalled within the fork tube cap and adapted to be reversibly journalled within the handle tube cap, and (iv) a fork lock lever, operationally coupled to the fork lock pin such that manipulation of the fork lock lever reversibly journals the fork lock pin in the handle tube cap.

According to another embodiment a multi-stage tricycle includes: (a) a front wheel, (b) a pedal lock coupled to the front wheel; and (c) a pedal bar journalled within the pedal lock and the front wheel, wherein the pedal lock is adapted to reversibly lock the pedal bar to the front wheel, such that when the pedal bar is locked to the front wheel then the tricycle is in a pedal-wheeling state and when the pedal bar is unlocked from the front wheel then the tricycle is in a free-wheeling state.

According to further features the pedal lock includes: (i) a sprocket wheel operationally coupled to the front wheel; (ii) a flange, fixedly mounted on the pedal bar; (iii) a sprocket pin, fixed mounted on the flange and the pedal bar; and (iv) a pedal lock sleeve mounted over the sprocket wheel having an internal lumen mounted with bars interlocking with spokes of the sprocket wheel only, in the free-wheeling state and adapted to further interlock with spokes of the sprocket pin in the pedal-wheeling state, wherein the pedal lock sleeve is adapted to reversibly engage the sprocket pin, in the pedal-wheeling state, by sliding the sleeve reversibly over the sprocket pin such that the bars additionally interlock with the spokes of the sprocket pin thereby operationally coupling the front wheel to the pedal.

BRIEF DESCRIPTION OF THE DRAWINGS

Various embodiments are herein described, by way of example only, with reference to the accompanying drawings, wherein:

FIG. 1A is an isometric rear view of the foldable tricycle of the immediate invention;

FIG. 1B is a top view of the foldable tricycle;

FIG. 2A is a partial view of the front assembly of the foldable tricycle;

FIG. 2B is an exploded view of FIG. 2A;

FIG. 2C is an isometric view of the front mount tube with the walls disappeared;

FIG. 3A-3E are views of the fork in various stages of deconstruction with various sections disappeared;

FIG. 4A is an isometric view of the mainframe coupled to a pair of hubless tubes;

FIG. 4B is an exploded view of FIG. 4A;

FIG. 4C is a front isometric view of an inverted-V-shaped bracket.

FIG. 5A is a rear-isometric view of handle and rear-wheel assembly;

FIG. 6A is a ring assembly;

FIG. 6B is an exploded view of FIG. 6A;

FIG. 6C is an inverse view of rocker swing lock depicted in FIG. 6B;

FIG. 8A is a left-rear isometric view of the innovative tricycle;

FIG. 8B is a magnified partial view of section B circled in FIG. 8A;

DESCRIPTION OF THE PREFERRED EMBODIMENTS

Figure 5B:
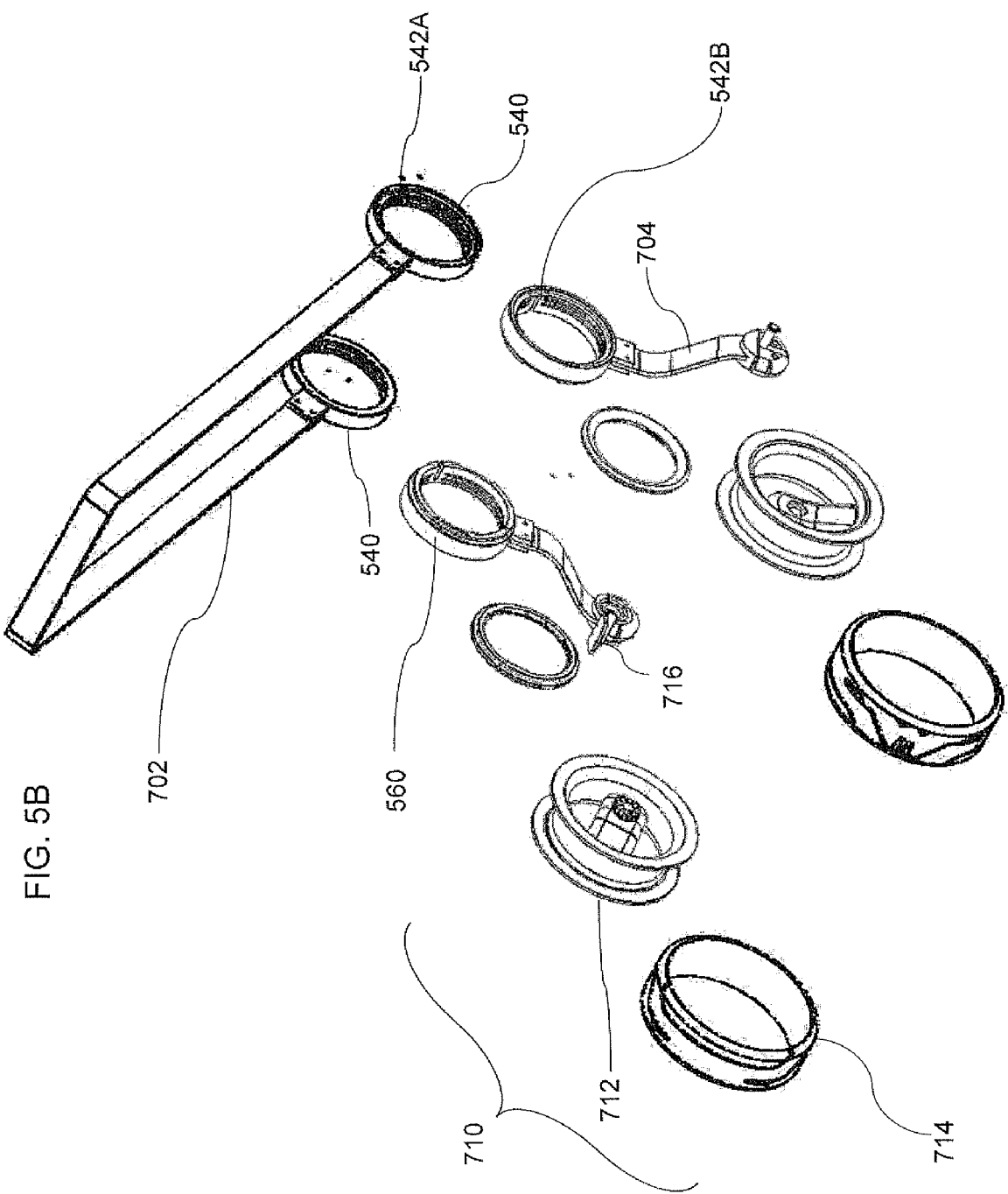
FIG. 5B is an exploded view of FIG. 5A.

The principles and operation of a foldable tricycle according to the present invention may be better understood with reference to the drawings and the accompanying description.

Referring now to the drawings, FIG. 1A illustrates an isometric rear view of an embodiment of the foldable multistage tricycle 10 of the immediate invention. The inventive tricycle has four general sections: a front assembly 100, a mainframe 300, a pair of folding ring assemblies 500 and a handle and rear-wheel assembly 700. Tricycle 10 is a multi-stage tricycle, where the term multi-stage is known in the art to refer to a vehicle such as a tricycle or baby stroller which can be easily modified in order to accommodate children at different stages of development. Generally, the immediate vehicle accommodates the following stages:

Stage 1: a child who is unable to pedal or steer the vehicle; a guardian or other responsible individual propels and steers tricycle 10 using a steering/guide handle 702. In this stage the handlebar is set to handle-free steering (discussed in detail below) and the pedals are set in free-wheeling mode (also discussed in further detail below) so that neither moving the handlebar nor rotating the pedal affects the movement of tricycle 10.

Stage 2: a child that is able to steer but not pedal or pedal but not steer; for this stage the guardian propels or directs the vehicle, either partially or fully, with steering handle 702 while the child either steers or pedals, depending on the specific abilities of the child. If the child is able to steer, then the handlebar is set to handle-directed steering, if the child is able to pedal then the pedals are set to 'pedal mode'. In some cases the child may be able to do both, but not for a sustained period of time. Furthermore, in some preferred embodiments the seat (not shown) is high backed and capable of being reclined (as with a stroller) to accommodate a sleeping child, in which case guide handle 702 is still needed.

Stage 3: guide handle 702 is removed and child rides independently.

Of course various embodiments of tricycle may fluffier include features known in the art such as a sun shade, foot rests (for very young children who cannot reach the pedals), basket etc. Furthermore, the inventive vehicle may be a quadricycle having two front wheels coupled to the external sides of a fork with the pedal arrangements disposed between the front wheels.

FIG. 1B is a top view of an embodiment of the foldable tricycle of the immediate invention. FIG. 1B affords a clear view of a pinlock 302 which is a rod journelled within a is Y-shaped chassis 304 of mainframe 300 and serves as part of a single-motion release mechanism discussed below. A pair of spring-loaded rocker swing locks 502, which are operationally coupled to folding ring assemblies 500, have handle sections with eyelets 504 (seen more clearly in FIGS. 6A-C) at the external ends that are visible in the Figure. Furthermore, a line 506 couples eyelets 504 together and a tether 508 is coupled to line 506 on one end and loops around the handle section of pinlock 302 so that pulling of the second end of tether 508 simultaneously draws pinlock 302 away from front assembly 100 while pulling line 506 towards front assembly 100 and likewise biasing rocker swing locks 502 in the same direction. The aforementioned single-motion pulling of tether 508 simultaneously unlatches mainframe 300 from front assembly 100 and unlocks ring assemblies 500, thereby allowing the innovative foldable tricycle to be converted from the assembled state depicted in FIGS. 1A/B, to a folded state depicted in FIG. 7.

FIG. 2A is a view of front assembly 100. FIG. 2B is an exploded view of FIG. 2A. Referring now also to FIGS. 2A and 2B, front assembly 100 includes a handlebar 112, a front mount 114, a fork 116 and a front wheel 118. Handlebar 112 further includes a handle tube 120. Handle tube 120 is hollow and terminates in a handle tube cap 121 (seen in FIGS. 3A-3C). Front mount 114 includes a front mount tube 122 and a front mount plate 123. Fork 116 includes a fork tube 124 capped with a fork tube cap 125, and includes two fork side tubes 126. A fork lock pin 134 is visible protruding out of fork tube cap 125. Front wheel 118 includes a tire 127, a front wheel/radial 129, a pedal 130 and a pedal lock 132. A pin 119 couples the front mount plate 123 to Y-shaped chassis 304 (so that even when front mount plate 123 is unlatched from pinlock 302, plate 123 is still connected to Y-shaped chassis 304. The aforementioned parts are discussed in further detail below.

FIG. 2C is an isometric view of front mount tube 122 with the walls of front mount tube 122 shown as transparent. Referring now also to FIG. 2C, front mount tube 122 is divided into a top half and a bottom half. The top half is adapted to receive handle tube 120 and the bottom half is adapted to receive fork tube 124. A divider 150 separates the two tubes. Divider 150 includes a channel 154 which is formed in the divider and a hole 152 in the center of the divider. A flange or bolt (not shown) runs through a hole in the center of handle tube cap 121, through hole 152 in the center of divider 150, and out through a hole in the center of fork tube cap 125. The bolt or flange is secured with a nut or some other securing means, thereby coupling handle tube cap 121 and fork tube cap 125 together in a manner which allows each tube to rotate independently of the other, but prevents the removal of either handlebar 112 or fork 116 from front mount tube 122. Front mount plate 123 is secured to front mount tube 122 via an aperture 156 formed in the bottom half of front mount tube 122.

In an unlocked state, fork lock pin 134 protrudes out of a hole in fork tube cap 125, into a channel 154, which is formed in divider 150, thereby restricting the arc of rotation of fork 116. That is to say that the potential rotation of fork 116 is limited to the freedom with which fork lock pin 134 is able to move within channel 154.

The aforementioned unlocked/uncoupled state, whereby handlebar 112 rotates freely of fork 116, is referred to herein as 'handlebar-free steering' whereby moving the handlebar does not effect the direction of tricycle 10. This state is helpful when a small child rides in the innovative tricycle while an adult or guardian pushes and directs tricycle 10 using steering handle 702. The child can 'steer' tricycle 10 (i.e. harmlessly move the handlebar from side to side, but feel like he is having a great time) without altering the direction of the vehicle.

For an older child, fork 116 can be coupled together with handlebar 112 in a locked/coupled state. In the locked state, fork lock pin 134 is elevated into a hole in handle tube cap 121, thereby locking fork 116 and handlebar 112 together. The caps, lever mechanism which manipulates fork lock pin 134 and fork lock pin 134 itself are discussed in further detail with reference to FIGS. 3A-3E. The locked or coupled state affords 'handlebar-directed steering' (i.e. where the child is able to steer tricycle 10 by moving the handlebar) which can be considered a more advanced stage of the multi-stage foldable tricycle.

FIGS. 3A-3E depict fork 116 in various stages of deconstruction with various sections not shown, so as to reveal inner sections of the part in clearer detail. FIG. 3A is a depiction of fork 116 and handle tube cap 121. Handle tube cap 121 and fork tube cap 125 have the same form (i.e. the two caps are identical but serve two different purposes and are positioned facing opposite directions), including two holding teeth 160 which are semi-circular and slightly raised off a circular plate. The curved sides of the semi-circular teeth are conformed to the curvature of the tube (i.e. handle tube 120 or fork tube 124) and serve to secure the cap in the tube. On each cap, one of the two teeth 160 has a hole 162 (mentioned above) which is adapted to receive fork lock pin 134. Fork lock pin 134 is journalled within fork tube cap 125 and is adapted to be journalled within handle tube cap 121 in the aforementioned locked state. As previously mentioned, handle tube cap 121 caps handle tube 120 and fork tube cap 125 caps fork tube 124. The caps are separated by divider 150 in front mount tube 122.

FIG. 3B depicts the view of FIG. 3A, but with fork tube 124 removed. Visible in FIG. 3B is the elongated body of fork lock pin 134 which traverses the internal lumen of fork tube 124. FIG. 3C depicts the same figure as FIG. 3B, except that fork side tubes 126 also are removed. An M-shaped bracket 136 intersects with a rocker-shaped bracket 138. Although caps 121 and 125 appear to abut each other, when in place, divider 150 (see FIG. 2C) is positioned between the two opposite-facing caps. FIG. 3D depicts the same view as FIG. 3C, except that M-shaped bracket 136 and fork tube cap 125 are removed. As can be seen in the figure, fork lock pin 134 is sufficiently elevated to enter into hole 162 of handle tube cap 121. Therefore, as depicted, tricycle 10 is in the locked/coupled state which affords handlebar-directed steering.

FIG. 3E depicts a similar view to FIG. 3D, except that fork tube cap 125 is removed as is rocker-shaped bracket 138. In the figure, fork lock pin 134 can be clearly seen coupled to a fork lock lever 140. Fork lock lever 140 can be manipulated to raise or lower fork lock pin 134.

FIG. 4A is a rear isometric view of mainframe 300 coupled to a pair of hubless tubes 520 of folding ring assemblies 500. FIG. 4B is an exploded view of FIG. 4A. FIG. 4C is a front isometric view of an inverted-V-shaped bracket 306, the rear-facing side of which can be clearly seen in FIG. 4B. Referring to FIG. 4B, Y-shaped chassis 304 includes a main body featuring two parallel metal plates 308, angled at an elbow bend and terminating in an end bracket 310, which is positioned perpendicular to—and connecting—parallel plates 308.

Arms 312 of Y-shaped chassis 304 extend rearwards from the connection points between parallel plates 308 and end bracket 310. Each hubless tube 520 is adapted to be coupled to one arm 312. End bracket 310 includes an aperture adapted to receive pinlock 302. At assembly, pinlock 302 is inserted through the aperture in end bracket 310. Pinlock 302 is journalled within a pinlock spring 314. Pinlock spring 314 terminates in a pinlock clip disk 316. Pinlock clip disk 316 is fitted into a groove 318 on pinlock 302 such that pinlock spring 314 is interposed between end bracket 310 and pinlock clip disk 316 thereby biasing pinlock 302 in the direction of front assembly 100.

Referring now also to FIG. 4C, inverted-V-shaped bracket 306 includes tabs 322 (one of which is more clearly seen in FIG. 4C) which slot into grooves 324 formed in parallel plates 308. A rear-facing plate 306A of inverted-V-bracket 306 (clearly viewed in FIG. 4B) includes an aperture 326 formed in the center thereof, which is adapted to receive a front tip of pinlock 302 which protrudes there-through. A forward-facing plate 306B of inverted-V-bracket 306 includes an open slot 320 which is adapted to receive front mount plate 123 (see FIG. 2B) which slides into slot 320 and latches onto chassis 304 as will be presently described.

As mentioned previously, front mount plate 123 is coupled to Y-shaped chassis 304 via pin 119. Plate 123 swivels about pin 119 when not latched to pinlock 302. When pinlock 302 is frontwardly biased (i.e. biased in the direction of front assembly 100 under pressure from pinlock spring 314 which expands between end bracket 310 and inverted-V-shaped bracket 306 where clip disk 316 comes into contact with bracket 306 and only the tip of pinlock 302 that extends beyond groove 318 protrudes beyond aperture 326 of bracket 306) and front mount plate 123 is swiveled to a position substantially parallel to parallel plates 308, then plate 123 latches above the extruding tip of pinlock 302 which holds plate 123 in place. When plate 123 is latched to chassis 304 then front assembly 100 is in an assembled state.

FIG. 5A is a rear-isometric view of handle and rear-wheel assembly (HRWA) 700. FIG. 5B is an exploded view of FIG. 5A. Referring to both FIGS. 5A and 5B, HRWA 700 includes steering/guide handle 702 coupled to a hubless handle ring 540 (handle ring 540 is also classified as belonging to ring assemblies 500—see FIGS. 6A-B). Rear wheels 710 are coupled to rear-wheel arms 704 which in turn are coupled to hubless wheel rings 560 (also classified as belonging to ring assemblies 500—see FIGS. 6A-B). Each wheel 710 includes a radial 712 and a tire 714. At least one brake lever 716 (only one brake lever is depicted in the Figure) is coupled to rear wheel arm 704 and adapted to be used by a guardian or other individual in concert with guide/steering handle 702 to secure tricycle 10 in place in a fashion similar to the brake of a baby stroller. The assumption is that an individual using guide handle 702 to fully control tricycle 10 would also need to secure the vehicle in place when untended. In some preferred embodiment, guide handle 702 is a telescoping handle (feature not shown).

Figure 7:
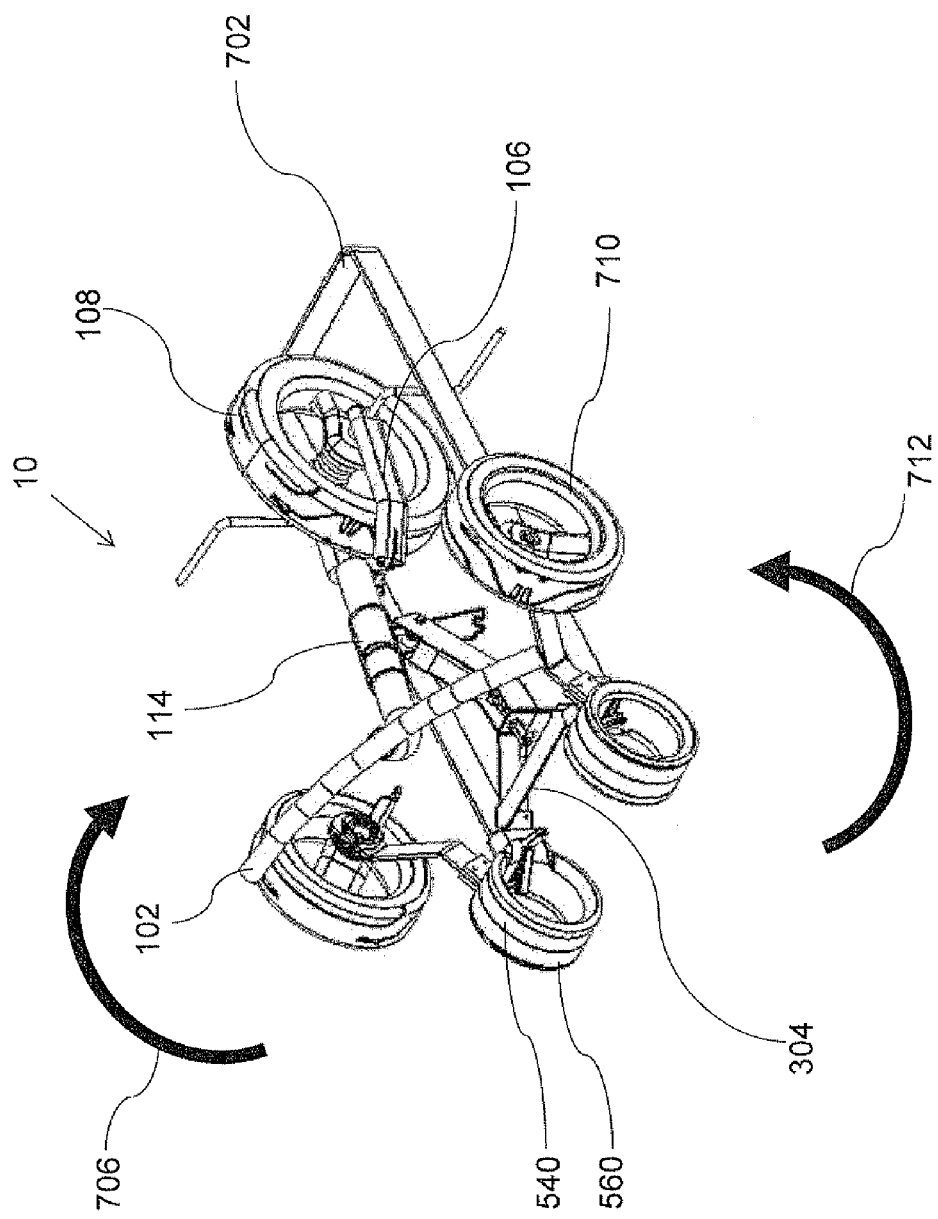
FIG. 7 is a rear-isometric view of the innovative tricycle in the folded state.

FIG. 6A depicts one ring assembly 500. FIG. 6B is an exploded view of FIG. 6A. Referring now to FIGS. 6A and 6B (as well as the previously discussed figures), handle rings 540 and wheel rings 560 are coaxially positioned such that hubless tube 520 defines an axle about which rings 540/560 are adapted to swivel. Handle rings 540, wheel rings 560 and hubless tubes 520 make up ring assemblies 500. Each of ring assemblies 500 has a locked state, where rings 540/560 are locked to hubless tube 520; and an unlocked state, whereby rings 540/560 swivel about hubless tube 520. HRWA 700 can either be locked in an assembled state (as seen in FIGS. 5A and 1A/B) or in a folded state which is depicted in FIG. 7.

FIG. 6A depicts a ring assembly 500 with spring-loaded rocker swing lock 502 swung out of a locking aperture 510 in hubless tube 520, so that the depicted ring assembly 500 is depicted in the unlocked state. Rocker swing lock 502 has locking arm 512 and a handle section 514 which includes eyelet 504 formed at the tip of handle section 514. FIG. 6C is an inverse view of rocker swing lock 502 as depicted in FIG. 6B. Referring now to FIG. 6C as well, locking arm 512 includes a rectangular block 518 (best seen in FIG. 6C) which is adapted to protrude through aperture 510 when rocker swing lock 502 is in the locked position. Locking arm 512 rests in aperture 510 and rectangular block 518 extrudes into a first locking groove 542 (seen best in FIG. 5A) which is formed by aligning a first locking groove portion 542A formed in hubless handle ring 540 with a first locking groove portion 542B formed in hubless wheel ring 560. When block 518 rests in first locking groove 542 then rotation of hubless rings 540/560 about hubless tube 520 is prevented and ring assemblies 500 are locked in an assembled configuration (i.e. tricycle 10 is in the assembled state).

When tricycle 10 is in the folded state then ring assemblies 500 are locked in a locked configuration whereby block 518 rests in a second locking groove (not shown) which is formed by aligning a second locking groove portion (not shown) formed in hubless handle ring 540 with a second locking groove portion 544B (partially shown) formed in hubless wheel ring 560.

Each ring assembly further includes a loose tongue 562, which is shaped to fit into an aperture 564 formed in the swivel guide grooves of hubless handle ring 540 and hubless wheel ring 560. The swivel guide grooves serve to couple handle ring 540 and wheel ring 560 together while allowing each ring to swivel freely. Loose tongue 562 limits the relative swivel range of handle ring 540 and wheel ring 560 by partially obstructing rotation of the rings relative to one another. Loose tongue limits the relative rotation of handle ring 540 to between about 95° and 150° of rotation and the swivel range of wheel ring 560 to between about 160° and 200° of rotation. A ring cap 580 is coupled to wheel ring 560 and serves to hide the inner parts of ring assembly 500 and complete the smooth, rounded look of hubless ring assembly 500.

FIG. 7 depicts a rear-isometric view of the innovative tricycle in the folded state. Referring to FIG. 7 (with further reference to previously discussed figures), during conversion between the assembled state and the folded state, steering handle 702 and handle rings 540 are rotated/swiveled in the direction of front assembly 100, pass in an arc (approximate arc direction depicted by an arrow 706) over front assembly 100 and steering handle 702 comes to rest in front of front assembly 100. At the same time, rear wheels 710, rear-wheel arms 704 and hubless wheel rings 560 can be rotated/swiveled in an arc (approximate arc direction depicted by an arrow 712) also in the direction of front assembly 100 but beneath chassis 304 so that ring assemblies 500 and front wheel 108 lie on the same horizontal plane while rear wheels 710 are elevated above the aforementioned horizontal plane.

The exact position of the various parts and assemblies is a matter of design and may therefore differ slightly from embodiment to embodiment. On the other hand the form of the innovative tricycle (with or without steering handle 702) and the innovative single pull mechanism for converting tricycle 10 from the assembled state to the folded (and vice versa) are central to the current innovation. Tricycle 10 further includes the above-described innovative feature for electively manipulating fork lock pin 134 to couple or uncouple fork 116 to handlebar tube 120 thereby selectively providing either handlebar-directed steering or handlebar-free steering.

Figure 8C:
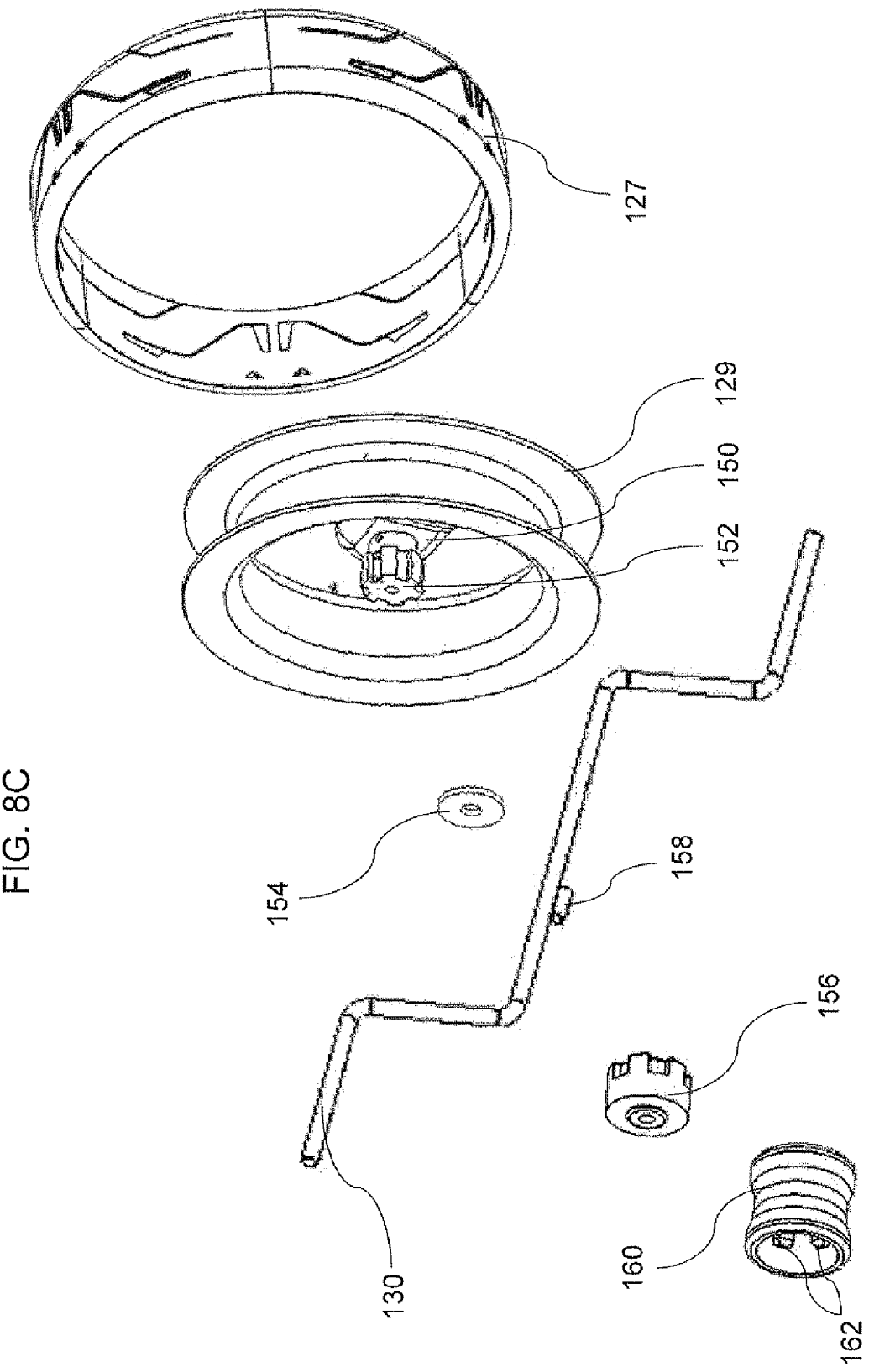
FIG. 8C is an exploded view of FIG. 8B.

A further innovative feature is described with reference to FIGS. 8A-C. FIG. 8A is a left-rear isometric view of tricycle 10. FIG. 8B is a magnified partial view of section B circled in FIG. 8A. FIG. 8C is an exploded view of FIG. 8B. Referring now to FIG. 8A, visible within circled section B is front wheel 118 including pedal lock 132 disposed between the hub of front wheel 118 and left fork tube 126. FIG. 8B provides a magnified and improved view of Section B. In FIG. 8B is can clearly be seen that pedal 130 runs through the center of pedal lock 132. Pedal lock 132 can be manipulated to lock pedal 130 to a hub 150 which is coupled to radial, 129 of front wheel 118. Referring now to FIG. 8C, tire 127 is fitted around radial 129 which includes a styled hub 150 on which a sprocket-wheel 152 is mounted. A flat washer 154 separates a sprocket pin 156 from sprocket-wheel 152. Pedal 130 includes a flange 158 mounted on the crossbar of pedal 130. Sprocket pin 156 is mounted on pedal 130 over flange 158. The internal volume of sprocket pin 156 is filled aside from an aperture which is adapted to receive the shape of pedal 130 and flange 158 such that the revolution of pedals 130 rotates sprocket pin 156. Only the crossbar of pedal 130 extrudes out of sprocket pin 156. Likewise, only the crossbar of pedal 130 goes through sprocket wheel 152 and hub 150 which means that the crossbar of pedal 130 rotates freely (i.e. without turning wheel 118) within hub 152 when sprocket pin 156 is not coupled to sprocket wheel 152. The aforementioned mode is termed 'free-wheeling' which means to say that pedaling pedals 130 has no affect on front wheel 118.

On the other hand, when sprocket pin 156 is coupled to sprocket wheel 152 then rotating pedal 130 causes reciprocal rotation of wheel 118. How is sprocket wheel 152 coupled to sprocket pin 156? A pedal lock sleeve 160 is adapted to electively couple or uncouple sprocket pin 156 to/from sprocket wheel 152. The internal lumen of sleeve 160 is populated with bars 162 at regular intervals over the internal surface of sleeve 160. Bars 162 serve as teeth which fit into/ interlock with spokes of sprocket wheel 152 and those of sprocket pin 156. Sprocket pin 156 caps sleeve 160 while the end of sleeve 160 which is closer to hub 150 fits over sprocket wheel 152 so that bars 162 engage spokes of sprocket wheel 152. Sleeve 160 can be manipulated so that bars 162 engage teeth of sprocket pin 156 while still engaging spokes of sprocket wheel 152, such that sprocket pin 156 and sprocket wheel 152 are operationally engaged such that the rotation of sprocket pin 156 (cause by rotation of pedal 130) effects rotation of sprocket wheel 152 and hence front wheel 118.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:
1. A foldable multi-stage tricycle, comprising:
    (a) a front wheel assembly;
    (b) a mainframe, latched to said front wheel assembly via a front mount;
    (c) a pair of rear-wheel assemblies;
    (d) a pair of folding ring assemblies coupling said rear-wheel assemblies to said mainframe; and
    (e) a mechanism for simultaneously unlocking said pair of ring assemblies and unlatching said mainframe from said front wheel assembly so that a single pulling motion on said mechanism unlocks and unlatches the foldable tricycle from an assembled state thereof so as to he converted to a folded state thereof.

2. The tricycle of claim 1, wherein said mainframe includes:
    (i) a Y-shaped chassis; and
    (ii) a pinlock, journalled within a pinlock spring, said pinlock spring terminating in a pinlock clip disk operationally coupled to said pinlock, wherein said pinlock is biased by said pinlock spring and adapted to reversibly latch said mainframe to said front mount.

3. The tricycle of claim 2, wherein each of said pair of ring assemblies includes:
    (i) a hubless tube, operationally coupled to said mainframe, said hubless tube including: (A) a spring-loaded rocker swing lock, and (B) a locking aperture, formed in said hubless tube, said locking aperture adapted to receive said rocker swing lock;
    (ii) a hubless handle ring, operationally coupled to said hubless tube and further adapted to be coupled to an arm of a guide handle; and
    (iii) a hubless wheel ring, operationally coupled to said hubless handle ring and to a said rear-wheel assembly, wherein said hubless wheel ring and said hubless handle ring are coaxially positioned, and wherein said hubless tube defines an axle about which said rings are adapted to swivel.

4. The tricycle of claim 3, wherein said mechanism includes:
    (i) a line, operationally coupling said spring-loaded rocker swing locks; and
    (ii) a tether, operationally coupled to said line and looped through a ring of said pinlock,
    wherein said tether is adapted to he pulled, thereby simultaneously retracting said pinlock and extracting said spring-loaded rocker swing locks from said apertures, thereby unlatching said front mount from said mainframe and unlocking said ring assemblies to allow the tricycle to be converted from said assembled state to said folded state.

5. The tricycle of claim 3, wherein said ring assemblies have a first, assembled, configuration when the tricycle is in said assembled state and a second, folded, configuration when the tricycle is in said folded state, and wherein said hubless wheel rings and said hubless handle rings are adapted to swivel about said hubless tubes when said spring-loaded rocker swing locks are located externally from said apertures, so as to reversibly convert the tricycle from said assembled state to said folded state.

6. The tricycle of claim 5, wherein in said first configuration, in each of said ring assemblies said rocker swing lock rests in said aperture of said hubless tube and protrudes partially through said aperture to rest in a first locking groove portion formed in said hubless handle ring and in a first locking groove portion formed in said hubless wheel ring, when said first locking groove portions are aligned, thereby preventing rotation of said hubless rings about said hubeless tube when in said first configuration, and
    wherein in said second configuration said rocker swing lock rests in said aperture of said hubless tube and protrudes partially through said aperture to rest in a second locking groove portion formed in said hubless handle ring and in a second locking groove portion formed in said hubless wheel ring, when said second locking groove portions are aligned, thereby preventing rotation of said hubless rings about said hubeless tube when in said second configuration.

7. The tricycle of claim 5, wherein each of said pair of ring assemblies further includes:
 (iv) a loose tongue, configured to be received within an aperture formed in swivel guide grooves of said hubless handle ring and said hubless wheel ring, so as to limit a swivel range of said hubless handle ring and said hubless wheel ring.

8. The tricycle of claim 7, wherein said limited swivel range of said hubless handle ring is between about 95° and 150° of rotation and wherein said limited swivel range of said hubless wheel ring is between about 160° and 200° of rotation.

9. The tricycle of claim 1, further comprising:
 (e) a guide handle, adapted to reversibly connect to said folding ring assembly.

10. The tricycle of claim 9, wherein said guide handle is a telescoping handle.

11. The tricycle of claim 1, wherein said front wheel assembly includes:
 (i) a handlebar;
 (ii) a handlebar tube, coupled to said handlebar;
 (iii) a fork, including a locking mechanism configured to reversibly couple said fork to said handlebar tube thereby electively providing handlebar-directed steering when said fork is coupled to said handlebar tube and handlebar-free steering when said fork is uncoupled from said handlebar tube.

12. The tricycle of claim 11, wherein said locking mechanism includes:
 (A) a handle tube cap, capping said handlebar tube,
 (B) a fork tube cap, capping said fork,
 (C) a fork lock pin, journalled within said fork tube cap and adapted to be reversibly journalled within said handle tube cap, and
 (D) a fork lock lever, operationally coupled to said fork lock pin such that manipulation of said fork lock lever reversibly journals said fork lock, pin in said handle tube cap.

13. The tricycle, of claim 11, wherein said front wheel assembly further includes:
 (iv) a front wheel, coupled to said fork,
 (v) a pedal lock coupled to said front wheel; and
 (vi) a pedal bar journalled within said pedal lock, wherein said pedal lock is adapted to reversibly lock said pedal bar to said front wheel, such that when said pedal bar is locked to said front wheel then the tricycle is in a pedal-wheeling state and when said pedal bar is unlocked from said front wheel then the tricycle is in a free-wheeling state.

14. The tricycle of claim 1, wherein said rear-wheel assemblies include:
 (i) rear-wheel arms, operationally coupled to said folding ring assemblies; and
 (ii) rear wheels, operationally coupled to said rear-wheel arms.

15. The tricycle of claim 14, wherein at least one of said rear-wheel assemblies further includes a brake lever operationally coupled to a braking mechanism for braking at least one of said rear wheels.

16. A multi-stage tricycle comprising:
 (a) a handlebar;
 (b) a handlebar tube, operationally coupled to said handlebar;
 (c) a front mount, associated with said handlebar tube;
 (d) a fork, associated with said front mount, said fork including a locking mechanism configured to reversibly couple said fork to said handlebar tube thereby electively providing handlebar-directed steering when said fork is coupled to said handlebar tube and handlebar-free steering when said fork is uncoupled from said handlebar tube, wherein said locking mechanism includes:
  (i) a handle tube cap, capping said handlebar tube,
  (ii) a fork tube cap, capping said fork,
  (iii) a fork lock pin, journalled within said fork tube cap and adapted to be reversibly journalled within said handle tube cap, and
  (iv) a fork lock lever, operationally coupled to said fork lock pin such that manipulation of said fork lock lever reversibly journals said fork lock pin in said handle tube cap.

17. A multi-stage tricycle comprising:
 (a) a front wheel,
 (b) a pedal lock coupled to said front wheel; and
 (c) a pedal bar journalled within said pedal lock and said front wheel, wherein said pedal lock is adapted to reversibly lock said pedal bar to said front wheel, such that when said pedal bar is locked to said front wheel then the tricycle is in a pedal-wheeling state and when said pedal bar is unlocked from said front wheel than the tricycle is in a free-wheeling state, wherein said pedal lock includes:
 (i) a sprocket wheel operationally coupled to said front wheel;
 (ii) a flange, fixedly mounted on said pedal bar;
 (iii) a sprocket pin, fixed mounted on said flange and said pedal bar; and
 (iv) a pedal lock sleeve mounted over said sprocket wheel having an internal lumen mounted with bars interlocking with spokes of said sprocket wheel only, in said free-wheeling state and adapted to further interlock with spokes of said sprocket pin in said pedal-wheeling state, wherein said pedal lock sleeve is adapted to reversibly engage said sprocket pin, in said pedal-wheeling state, by sliding said sleeve reversibly over said sprocket pin such that said bars additionally interlock with said spokes of said sprocket pin thereby operationally coupling said front wheel to said pedal.

* * * * *